United States Patent [19]

Tolnai

[11] 4,009,863
[45] Mar. 1, 1977

[54] COMPOSITE LIP SEAL FOR LAVATORY OR SINK VALVE

[75] Inventor: Julius L. Tolnai, Los Angeles, Calif.

[73] Assignee: Price Pfister Brass Mfg. Co., Pacoima, Calif.

[22] Filed: Oct. 17, 1975

[21] Appl. No.: 623,436

[52] U.S. Cl. .............................. 251/172; 251/174; 277/188 R

[51] Int. Cl.² ........................................ F16K 25/00

[58] Field of Search .......... 285/111, 112; 251/175, 251/172, 171, 174; 277/181, 182, 186, 184, 108

[56] References Cited

UNITED STATES PATENTS

| 2,901,271 | 8/1959 | Zoldak | 285/112 X |
| 2,943,838 | 7/1960 | Skei | 251/175 X |
| 3,661,181 | 5/1972 | Palmer et al. | 251/175 X |
| 3,680,874 | 8/1972 | Schwarz | 285/111 X |

*Primary Examiner*—Harold W. Weakley
*Attorney, Agent, or Firm*—Flam & Flam

[57] ABSTRACT

A valve control stem extends through a thick sleeve-like sealing member fitted in a valve body. The sealing member has a short passage linking a body inlet port with the control stem. The passage has an intermediate enlargement forming an atrium or pressure chamber. The chamber forms outer and inner lips which are urged by supply pressure to seal against the valve body on the outside and (in the OFF position) against the control stem on the inside. A ring insert in the atrium provides a mechanical assist positively forcing the lips into sealing position and corrects for any imperfections in the lips that might otherwise prevent initiation of a proper seal. A reliable and effective seal is achieved.

2 Claims, 8 Drawing Figures

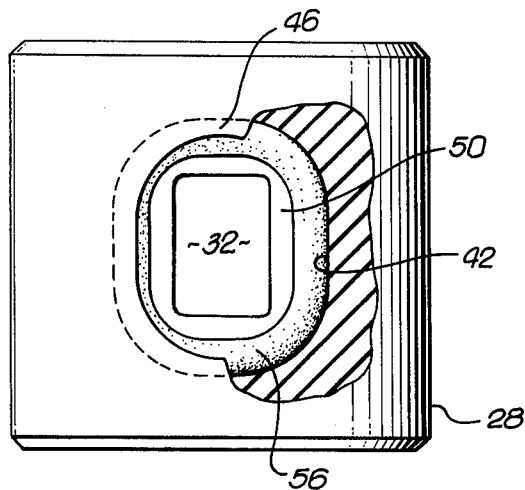
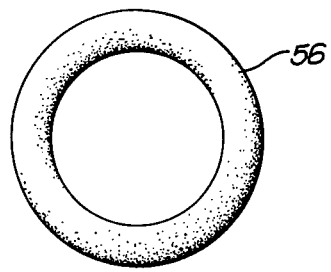
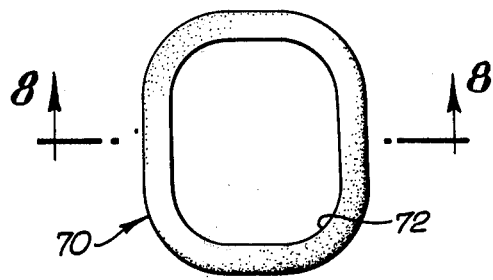
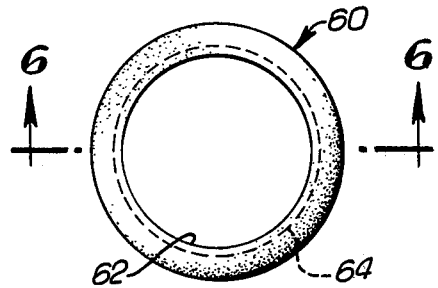
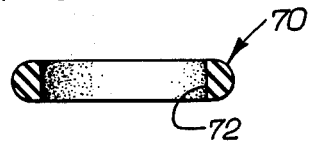
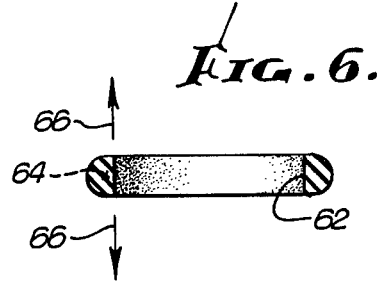

COMPOSITE LIP SEAL FOR LAVATORY OR SINK VALVE

FIELD OF INVENTION

This invention relates to a lip seal for a flow control valve such as a sink mixing valve or a shut-off valve for plumbing appliances or the like. More particularly this invention relates to a lip seal of the type shown and described in U.S. Pat. No. 3,661,182 issued May 9, 1972 to Patsy B. Palmer and Julius L. Tolnai.

BACKGROUND OF THE INVENTION

In the above-identified U.S. patent, there is shown and described a thick sleeve-like seal member through which a valve control stem extends, the seal member having a transverse flow passage having an enlargement or atrium to form inner and outer lips flexed under the influence of line pressure to assist in providing a seal. The inner lip engages the peripheral surface of the control stem in the OFF position and the outer lip engages about the supply port. Flow is controlled by moving the stem axially until a relieved portion is opposed to the seal member passage. A cage supports the seal member to restrain the inside lip against excessive inward movement. The lip has a bead at its edge that projects through a corresponding cage aperture in order to achieve the required engagement with the control stem at the OFF position.

In the manufacture of such resilient seal members, a certain small percentage tend to deflect very slightly at the region of the inner lip so that, upon application of line pressure, an imperfect static seal exists as water enters behind the bead. A net hydraulic pressure never builds sufficiently up in the atrium. The result is a defective valve. Of course the valves are factory tested. But a reject rate of even one per hundred is costly. There is no known fast, simple method of advance testing the seal members themselves.

The primary object of this invention is to provide a simple structural arrangement that obviates individual testing of the seal members and that results in a reliable valve that performs satisfactorily notwithstanding slight dimensional variations in the seal member.

SUMMARY OF THE INVENTION

In order to accomplish the foregoing object, I provide a mechanical means for flexing the lips outwardly so that, when the seal member is assembled, a positive initial sealing force is provided that ensures that a net hydraulic pressure will build up in the atrium. The mechanical assist is achieved by a simple resilient ring that is inserted in the atrium. In practice, the ring can take a variety of configurations.

BRIEF DESCRIPTION OF THE DRAWINGS

A detailed description of the invention will be made with reference to the accompanying drawings wherein like numerals designate corresponding parts in the several figures. These drawings, unless otherwise indicated, are to scale.

FIG. 3 is a side elevational view of the seal member taken in a direction by line 3—3 of FIG. 2, a portion of the seal member being broken away.

FIG. 4 is a plan view of a ring shown in FIG. 3.

FIG. 5 is an elevational view of an alternate ring structure.

FIG. 6 is a transverse sectional view taken along the plane corresponding to line 6—6 of FIG. 5.

FIG. 7 is an elevational view of another modified ring structure.

FIG. 8 is a transverse sectional view taken along the plane corresponding to line 8—8 of FIG. 7.

DETAILED DESCRIPTION OF FIRST EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
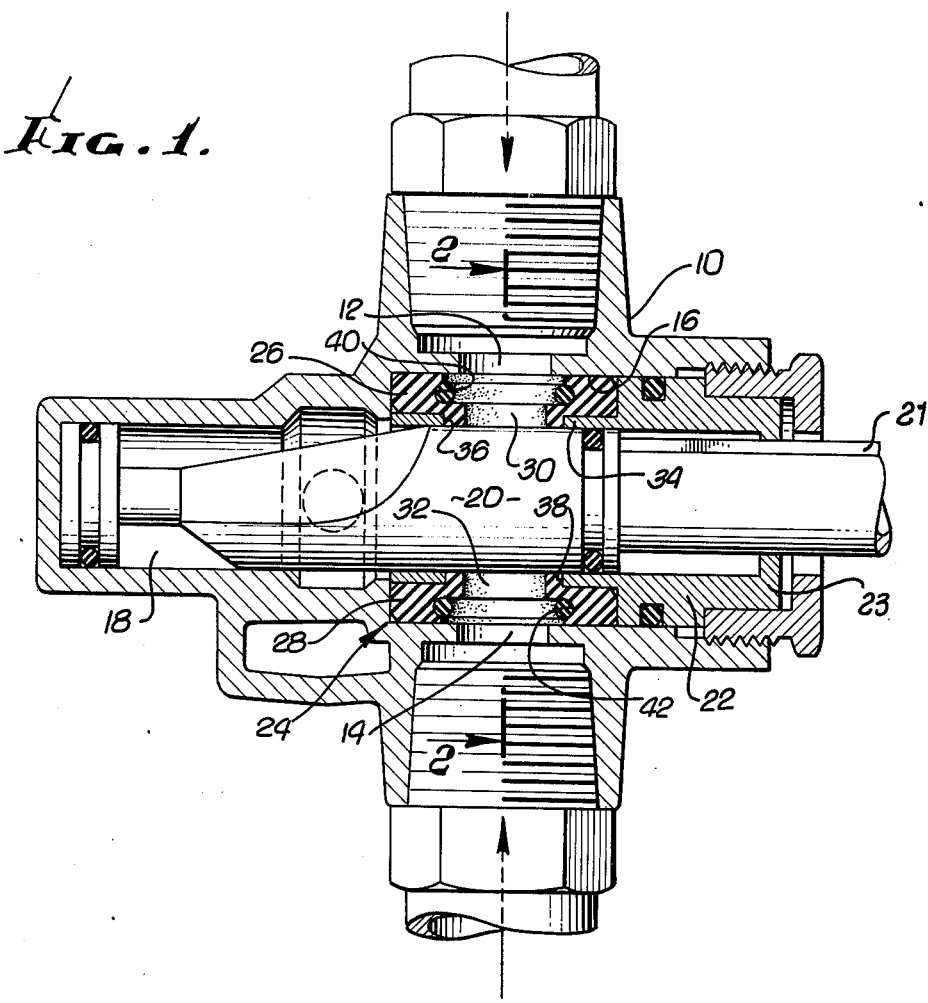
FIG. 1 is an axial sectional view of a mixing valve incorporating the present invention.
Figure 2:
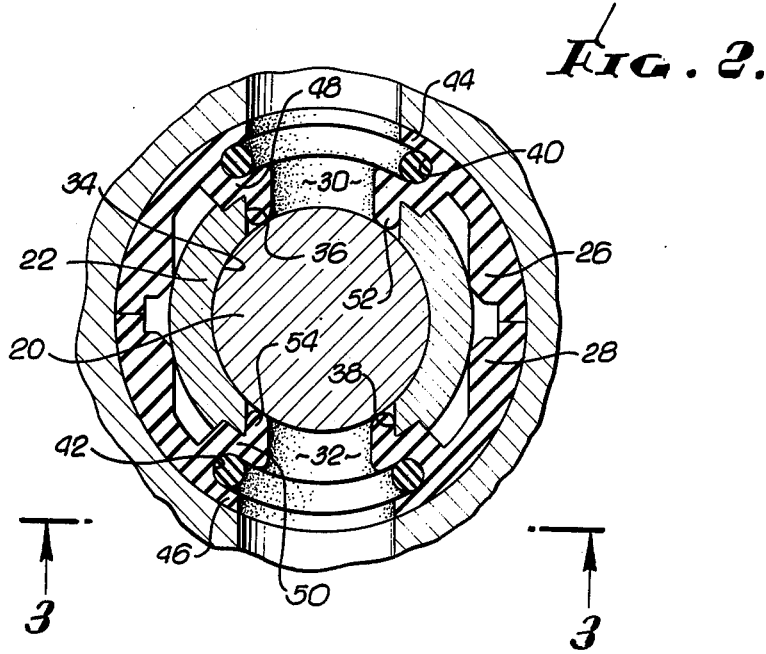
FIG. 2 is a fragmentary transverse sectional view taken along a plane corresponding to line 2—2 of FIG. 1.

The valve structure shown in FIGS. 1 and 2, except for the seal member, is identical to the valve structure shown in U.S. Pat. No. 3,661,181 issued May 9, 1972 to Patsy B. Palmer ad Julius L. Tolnai, and to which reference is made for more complete description thereof.

The valve structure in the present instance is a mixing valve shown for purposes of illustrating the general principles of the invention. The present invention is equally applicable to other valves that include lip seal members. Another such valve is shown and described in my U.S. Pat. No. 3,865,139 issued Feb. 11, 1975 and entitled APPLIANCE SHUTOFF VALVE.

The valve (FIGS. 1 and 2) includes a body 10 having a hot water port 12 and a cold water port 14 on opposite side of a generally cylindrical chamber 16. Hot and cold water entering the ports 12 and 14 passes to a receiving or outlet chamber 18 under the control of a valve stem 20. The stem 20 is guided for axial angular movement by a cage 22.

In order to define limits to angular movement of the stem 20, the reduced outer end of the stem is provided with a rib or ridge 21 that cooperates with ends (not shown) of an internal arcuate flange 23 at outer end of the cage 22.

A generally cylindrical sleeve-like seal member 24 surrounds the stem 20 and at its outer surface fits the chamber 16. The seal member is supported upon the reduced inner end of cage 22 installed in the chamber 16. The seal member 24 is made in this instance of two identical semi-circular rather thick segments 26 and 28 (FIG. 2). The seal segments are made of molded flexible material such as neoprene. Each seal segment 26, 28 has a short transverse passage 30, 32 that communicates the corresponding inlet port 12, 14 to the through bore 34 of the cage 22 and the exterior of the control stem 20. The cage has registering openings 36, 38.

Each seal segment passage 30, 32 has an intermediate enlargement or atrium 40, 42 intermediate the ends of its passage 30, 32. The atrium 40, 42 forms an outer lip 44, 46 and an inner lip 48, 50. A bead 52, 54 at the edge of the inner lip 48, 50 projects through the case hole 36, 38 for contact with the valve stem in the closed or OFF position illustrated.

As described in said U.S. Pat. No. 3,661,182, the inner and outer lip of the seal segment 26, 28 is intended to be forced by a net hydraulic pressure against the inside of the valve body at the port 12, 14 and (when the valve stem is in its OFF position) against the peripheral cylindrical surface of the valve control stem 20. In order to provide an initial mechanical assist to ensure that a net hydraulic pressure results, an insert is provided for the atrium 40, 42. The insert takes the form of a circular O-ring 56 (FIGS. 3 and 4) that is more or less seated in the deep part of the atrium. The ring engages near the proximal part of the inner lip, leaving the distal part free to be subject to hydraulic forces. Yet the ring exerts a force at the proximal part sufficient to flex the inner lip 48, 50 toward the control stem 20.

The nominal thickness of the ring is slightly greater than the nominal inside spacing between the inner and outer lips. This assures a positive flexure. The bead 52, 54 is urged inwardly of the cage opening 36, 38. Any slight asymmetry or distortion is overcome. A net hydraulic force to provide an effective seal is ensured.

The O-ring 56 of the form shown in FIGS. 1 and 2 is normally circular in plan (FIG. 4) as well as circular in cross-section. Thus the ring is, in this instance, a conventional, commerically available element. The atrium that it fits is generally rectangular or oval to conform to the rectangular configuration of the valve ports (FIG. 3). The circumferential dimension of the O-ring correspond to the circumferential dimension of the atrium wall. Hence as the ring is installed, it is distorted to conform to the atrium configuration. This causes the O-ring 56 to compress at the corners and thus bulge laterally, that is, in the direction transverse to the seal segment. This results in a slight excess lip pressure at the corners.

In order to minimize the excess corner pressure, the O-ring can be specially molded. Thus, in the form illustrated in FIGS. 5 and 6, the inside surface 62 of the ring 60 is flattened so that the inside surface falls close to the center loop or line 64 of the outside surface. The compression at the corner regions is reduced. The lateral bulging in the direction of arrows 66 is correspondingly reduced. This also opens the lip for slightly greater access of hydraulic pressure.

In the form illustrated in FIGS. 7 and 8, the plan contour of the ring 70 is oval in order more nearly to conform to that of the atrium. Also, the inside surface 72 is flattened.

Intending to claim all novel, useful and unobvious features shown or described, I make the following claims:

1. In a valve structure:
  a. a valve body member;
  b. a valve control member;
  c. said valve body member having an inlet port opening at a surface opposed to said valve control member;
  d. means guiding said valve control member for movement transverse to said inlet port for controlling the flow of fluid, said valve control member having a closed position in which a surface of said valve control member is opposed to and spaced from said valve body member surface;
  e. a flexible seal member interposed between said valve control member and said valve body member, said seal member having a passage to conduct fluid from said inlet port to the valve control member, said passage having a multi-sided configuration with corners between the sides;
  f. said passage having an intermediate enlargement forming a continuous inner lip and a continuous outer lip respectfully cooperable with the valve body member surface and said valve control member surface the distal edges of which lips define said multi-sided configuration; said lips being subjected to fluid pressure conducted to said enlargement via said inlet port to urge said lips into sealing engagement with said surfaces; and
  g. compressible and resilient endless ring means fitted in the bottom of said enlargement and about said corners, said ring means having a nominal thickness slightly greater than the nominal spacing between said lips thus providing a mechanical assist to the sealing engagement of said lips to said surfaces and to prevent distortions of said lip from precluding an operative seal, said ring means having a substantially D-shaped cross-sectional configuration with the flat located on the inside of the ring, said D-shaped configuration minimizing lateral bulge at said corners.

2. The valve structure as set forth in claim 1 in which said surfaces are correspondingly concave and convex, said ring means having a multi-sided non-circular ring contour corresponding substantially to that of said passage.

* * * * *